United States Patent
Kuvettu et al.

(10) Patent No.: US 6,858,556 B2
(45) Date of Patent: Feb. 22, 2005

(54) STABILIZED DUAL ZEOLITE SINGLE PARTICLE CATALYST COMPOSITION AND A PROCESS THEREOF

(75) Inventors: Mohan Prabhu Kuvettu, Haryana (IN); Sanjay Kumar Ray, Haryana (IN); Gopal Ravichandran, Haryana (IN); Venkatchalam Krishnan, Haryana (IN); Satyen Kumar Das, Haryana (IN); Satish Makhija, Haryana (IN); Sobhan Ghosh, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 226 days.

(21) Appl. No.: 10/084,637

(22) Filed: Feb. 25, 2002

(65) Prior Publication Data

US 2003/0166453 A1 Sep. 4, 2003

(51) Int. Cl.[7] .......................... B01J 29/08; B01J 29/40; B01J 29/18; B01J 29/80
(52) U.S. Cl. ............................ 502/67; 502/64; 502/65; 502/68; 502/71; 502/73; 502/77; 502/78; 502/79; 502/80; 502/84
(58) Field of Search ..................... 502/63, 64, 65, 502/67, 68, 71, 73, 77, 78, 79, 80, 84

(56) References Cited

U.S. PATENT DOCUMENTS

| 3,676,368 | A | * | 7/1972 | Scherzer et al. ............... 502/65 |
| 3,758,403 | A | * | 9/1973 | Rosinski et al. ............... 502/67 |
| 3,847,793 | A | | 11/1974 | Schwartz et al. |
| 3,867,308 | A | | 2/1975 | Elliott, Jr. |
| 3,957,689 | A | | 5/1976 | Ostermaier et al. |
| 4,153,535 | A | * | 5/1979 | Vasalos et al. ......... 208/120.05 |
| 4,309,280 | A | | 1/1982 | Rosinski et al. |
| 4,326,993 | A | * | 4/1982 | Chester et al. ................ 502/66 |
| 4,333,857 | A | | 6/1982 | Lim et al. |
| 4,828,679 | A | * | 5/1989 | Cormier et al. ........ 208/120.05 |
| 4,987,110 | A | | 1/1991 | Scherzer |
| 5,190,902 | A | | 3/1993 | Demmel et al. |
| 5,286,369 | A | | 2/1994 | Roberie et al. |
| 5,997,728 | A | | 12/1999 | Adewuyi et al. |
| 6,137,022 | A | | 10/2000 | Kuechler et al. |
| 6,156,947 | A | | 12/2000 | Vora |
| 6,258,257 | B1 | | 7/2001 | Swan, III et al. |
| 6,566,293 | B1 | * | 5/2003 | Vogt et al. .................... 502/67 |

FOREIGN PATENT DOCUMENTS

EP 0 167 325 1/1986

* cited by examiner

*Primary Examiner*—Christina Ildebrando
(74) *Attorney, Agent, or Firm*—RatnerPrestia

(57) ABSTRACT

A process for the preparation of a stabilized dual zeolite catalyst-comprising two types of zeolites, a low silica molecular sieve and a stabilized high silica zeolite is disclosed. The catalyst is useful for cracking heavier hydrocarbons into lighter useful products.

35 Claims, No Drawings

STABILIZED DUAL ZEOLITE SINGLE PARTICLE CATALYST COMPOSITION AND A PROCESS THEREOF

FIELD OF THE INVENTION

The present invention relates to a stabilized dual zeolite low coke forming single particle catalyst, bonded with silica alumina binder, for cracking heavy residual hydrocarbons into lighter products. The present invention also relates to a process for the preparation of the stabilized dual zeolite catalyst.

BACKGROUND OF THE INVENTION

Catalytic cracking today constitutes several refining processes in which heavier hydrocarbons are cracked into lighter useful products. They are fluid catalytic cracking (FCC), hydrocracking, reforming, etc. FCC process is simple and highly flexible as required product slate can be obtained with varying feed properties.

The earliest catalysts used for fixed bed cracking were based on acid reacted clays. The exigencies imposed during the Second World War provided required acceleration to the concept and growth of moving bed catalytic cracking process. This process demanded more rugged catalysts than activated clays. Demand for this was met by more active silica alumina gel based synthetic catalysts, which provided an improved physical stability, and greater selectivity.

Grinding and screening methods were used to produce catalyst particles of required size. Later, spray drying technique produced catalyst particles of required size and with improved attrition resistance suitable for fluid bed reactor systems.

Introduction of silica-magnesia based matrix provided greater selectivity towards the production of middle distillates than silica-alumina based catalysts. One of the most significant developments in the area of cracking catalyst was the introduction of crystalline inorganic synthetic products called "Y zeolites".

The Y zeolites having discrete pores in the range 6.5 to 13.5° A, higher surface area and higher acidity compared to the amorphous silica-alumina based catalysts generated higher catalytic activity and much more selectivity towards gasoline.

Later on, by employing rare earth exchanged Y zeolites and ultra stable Y zeolites many active and stable catalysts were developed.

Along with the introduction of highly stable cracking components like zeolites in different forms, in the past, there have been gradual improvements in binder system used for binding these crystalline materials into attrition resistant microspheres.

Use of silica sol based binder system in the preparation of zeolite promoted catalysts is cited in U.S. Pat. No. 3,867,308 and alum buffered silica-sol is described in U.S. Pat. No. 3,957,689.

Binding of low soda Y zeolite with gel alumina and polysilicate has been described in U.S. Pat. Nos. 4,333,857 and 4,326,993.

U.S. Pat. No. 4,987,110 refers to the preparation of attrition resistant FCC catalysts using low soda silica sol, REUSY and aluminum chlorohydrol.

Product selectivity of faujasite zeolite (also referred as Y zeolite) based catalysts is restricted to gasoline range molecules, due to the presence of uniform size large pores in the range 6.5° A and 13.5° A. For enhancing $C_3$ to $C_4$ selectivity, for first time ZSM-5 zeolites having pores in the range 5.4 to 5.5° A, were employed along with faujasite zeolites, in a conventional silica-alumina based binder system and process for this is described in U.S. Pat. No. 3,758,403.

U.S. Pat. No. 3,847,793 describes a process for conversion of hydrocarbons with a dual cracking component catalyst comprising ZSM-5 zeolite based catalyst and large pore zeolite based catalyst.

U.S. Pat. No. 6,258,257 refers to a process for producing polypropylene from $C_3$ olefins by a two-stage fluid catalytic cracking process having two types of catalysts made from zeolites of large pore and medium pore.

U.S. Pat. No. 6,137,022 discloses a process of making an olefin product from an oxygenated feedstock by contacting the feedstock in a reaction zone containing 15 volume percent or less of a catalyst, preferably a catalyst comprising a silica-alumina-phosphate molecular sieve.

Another method of adding ZSM-5 to a moving bed catalytic cracking unit is disclosed in the published European Application No. EP 0167325A3. The make-up catalyst may contain 2 or 3 times the amount of ZSM-5 sought for the equilibrium catalyst.

U.S. Pat. No. 6,156,947 refers to a process for jointly producing butene-1 and ether in a catalytic distillation column, which comprises an upper catalytic zone for etherification and a lower catalytic zone for isomerization of $C_3$ to $C_4$ olefins and conversion of butadiene.

U.S. Pat. No. 5,997,728 refers to a process for catalytically cracking of a heavy feed in a FCC unit, with large amounts of shape selective cracking additive. The catalyst inventory preferably contains at least 10 wt % additive, of 12–40% ZSM-5 on an amorphous support, equivalent to more than 3.0 wt % ZSM-5 crystal circulating with equilibrium catalyst. This process yields large amount of light olefins, without excessive production of aromatics, or loss of gasoline yield.

U.S. Pat. No. 4,309,280 describes a process for maximizing of LPG by adding very small amounts of powdered, neat ZSM-5 catalyst, characterized by a particle size below 5 microns to the FCC catalyst inventory.

U.S. Pat. No. 5,190,902 refers to a process for the preparation of attrition resistant binder particles by spray drying of clay phosphate slurry with adjusted pH. At extreme pH conditions (pH above 12 and below 2), aluminum in clay is converted to $Al^{+++}$ ions and on calcination in presence of phosphate ions, forms aluminum phosphate binder. This reaction condition is exploited in developing attrition resistant microspheres. It may be noted from the different examples that, clay-phosphate based binder is particularly suitable for zeolites with higher silica to alumina ratio and not suitable for binding low $SiO_2$ to $Al_2O_3$ ratio (ratio below 6) zeolites. This is due to the fact that, at lower pH conditions alumina of zeolite is also likely to get ionized and phosphate will not differentiate between alumina of clay and alumina of zeolite and react with both. This leads to the removal of alumina of zeolite framework, there by substantially reducing catalytic activity of the zeolite.

U.S. Pat. No. 5,286,369 describes a phosphate based binder composition suitable for binding high silica zeolites. Here, reaction between aluminum nitrate and phosphoric acid forms aluminum phosphate binder. However, during the reaction, along with the formation of aluminum phosphate binder, nitric acid is also formed as a by-product as per following reaction.

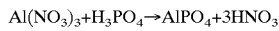

Presence of nitric acid is detrimental to the stability of Y zeolites due to dealumination.

Recent work on ZSM-5 additive has been directed at stabilizing the zeolite and also making the additive more attrition resistant. Phosphorus stabilized ZSM-5 additive is believed to retain activity for a longer time. ZSM-5 zeolite based catalysts in absence of phosphate have tendency to get dealuminated under hydrothermal conditions.

Conventional silica-alumina binders used for binding Y type zeolites cannot be used for binding ZSM-5 zeolites, as they do not contain required phosphate for stabilizing these zeolites. Clay-phosphate based binders used for binding ZSM-5 zeolites cannot be used for binding Y zeolites having lower $SiO_2$ to $Al_2O_3$ ratio, due to severe dealumination which results in loss of catalytic activity.

While Y zeolite based FCC catalysts with conventional silica-alumina binder selectively crack heavy feed molecules into gasoline range molecules, ZSM-5 zeolite based catalysts bonded with clay phosphate binder selectively produce higher amount of $C_3$ to $C_4$ olefins by selective cracking of paraffins and alkyl aromatics present in the feed.

Differences in cracking pattern with two catalysts made with ZSM-5 and Y zeolite is attributed to the size and architecture of the pores present in these two zeolites. These two zeolites cannot be bonded with a common binder. Present practice of employing ZSM-5 zeolites for conventional FCC reaction is through making separate additive catalyst with a phosphate based binder and these catalysts are called as ZSM-5 additives. These additives are used in the range 1 to 6 wt % level of total catalyst present in inventory. Further increase in ZSM-5 additive catalyst in the inventory reduces the catalytic conversion, due to the dilution effect. This limitation in conversion on using additives in place of FCC catalysts, is due to the fact that, only medium pores in the range 5.4 to 5.5° A are present in ZSM-5 zeolites. These pores will not permit the entry of bulky hydrocarbon molecules for cracking. This limitation is known as "reactant selectivity" and is explained in an issue of "Zeolites" 4, 203 (1984). Further, distribution of ZSM-5 zeolite particles is restricted only on additive catalyst particles and hence effective use of this zeolite is limited.

Hence, there is a need to develop a process for a cracking catalyst, which can simultaneously bind both large pore Y zeolite with low $SiO_2$ to $Al_2O_3$ ratio and medium pore, high silica ZSM-5 zeolite. Formulation of single particle cracking catalyst with two types of zeolites will address the limitations encountered with the existing catalyst formulations.

OBJECTS OF THE INVENTION

The primary object of the present invention is to provide a stabilized dual zeolite catalyst with a common silica alumina binder for binding high silica zeolite and low silica molecular sieve.

Another object of the present invention is to provide a stabilized dual zeolite catalyst having low coke formation for catalytic cracking process.

Yet another object of the present invention is to provide a stabilized dual zeolite catalyst having an enhanced hydrothermal stability.

Still another object of the present invention is to provide a stabilized dual zeolite catalyst with enhanced stability of Y zeolite.

Yet another object of the present invention is to provide a stabilized dual zeolite catalyst to handle bulky hydrocarbon molecules present in the feed.

Still another object of the present invention is to develop a process for preparing a stabilized dual zeolite catalyst composition suitable for catalytic cracking process.

Further object of the present invention is to develop a process for preparing cracking catalyst for enhancing conversion and LPG selectivity.

Yet another object of the present invention is to develop a process for simultaneously reduce bottom and enhance LPG.

Still another object of the present invention is to develop a process for preparing stabilized high silica zeolite, which is suitable for incorporation to conventional silica alumina binder.

Yet another object of the present invention is to develop a process for preparing pure stabilized high silica zeolite, which is suitable for incorporation in to conventional silica alumina binder.

It is another object of the present invention to develop a process for preparing pure stabilized high silica zeolite, which is suitable for incorporation to conventional silica alumina binder along with low soda rare earth exchanged Y zeolite.

It is further object of the present invention to develop a process for preparing a catalyst composition by incorporating increased amount of stabilized high silica zeolite in to silica alumina binder without diluting conversion efficiency of Y zeolite component.

Yet another object of the present invention is to develop a process for a cracking catalyst having improved hydrothermal stability.

SUMMARY OF THE INVENTION

The present invention provides a stabilized dual zeolite low coke forming single particle catalyst, bonded with silica alumina binder, suitable for cracking heavy residual hydrocarbon feeds and having enhanced hydrothermal stability and the process for binding high silica zeolite and low silica molecular sieve into a stabilized dual zeolite catalyst.

DETAILED DESCRIPTION OF THE PREFERRED EMBODIMENTS

Accordingly, the present invention provides for a stabilized dual zeolite low coke forming single particle catalyst, bonded with silica alumina binder, suitable for cracking heavy residual hydrocarbon feeds and having enhanced hydrothermal stability, said catalyst comprising:

(a) stabilized high silica zeolite in the range of 1 wt % to 50 wt %;
(b) low silica molecular sieve in the range of 1 wt % to 40 wt %;
(c) silica in the range of 1 wt % to 15 wt %;
(d) alumina in the range of 5 wt % to 30 wt %; and
(e) clay in the range of 10 wt % to 50 wt %;

An embodiment of the present invention wherein the stabilized high silica zeolite consist of:

(a) a phosphate source in the range of 1 wt % to 40 wt %;
(b) high silica zeolite in the range of 5 wt % to 99 wt %; and
(c) clay in the range of 0 wt % to 50 wt %.

Another embodiment of the present invention wherein the clay is selected from the group consisting of kaolin and halloysite.

Yet another embodiment of the present invention wherein the high silica zeolite is selected from the group consisting of ZSM-5, ZSM-11, ZSM-12, ZSM-23, ZSM-35, ZSM-38, ZSM-48, ZSM-57, Zeolite beta, mordenite and preferably ZSM-5.

Still another embodiment of the present invention wherein the low silica molecular sieve is selected from the group consisting of faujasite, mordenite, beta, MCM mesoporous zeolite and L.

Yet another embodiment of the present invention wherein the low silica molecular sieve is exchanged with $NH_3$.

Still another embodiment of the present invention wherein the low silica molecular sieve is exchanged with rare earth cations selected from the group consisting of lanthanum, cerium, praseodymium, neodymium, samarium and gadolinium.

Yet another embodiment of the present invention wherein the low silica molecular sieve having rare earth metal oxides in the range of 0.1 to 10 wt %.

Still another embodiment of the present invention wherein the phosphate source is selected from the group consisting of phosphoric acid, ammonium di hydrogen phosphate, ammonium mono hydrogen phosphate, tri-ammonium phosphate, ammonium hypophosphate, ammonium ortho phosphate, ammonium di hydrogen ortho-phosphate, ammonium mono hydrogen ortho-phosphate, ammonium hypo phosphite, ammonium di hydrogen ortho-phosphite or a mixture thereof.

Yet another embodiment of the present invention wherein the alumina is a pseudoboehmite having a crystal size ranging from about 3 nm to 30 nm.

Still another embodiment of the present invention wherein the silica is in colloidal form of particles having a mean diameter ranging from about 4 nm to 30 nm. Yet another embodiment of the present invention wherein the stabilized high silica zeolite has silica to alumina ratio from 10 to 300.

Still another embodiment of the present invention wherein the silica alumina binder is a reaction product of acidified colloidal silica and acidified pseudoboehmite alumina.

Yet another embodiment of the present invention wherein the organic acid used for acidifying colloidal silica is selected from the group consisting of nitric acid, hydrochloric acid, formic acid and acetic acid.

Further embodiment of the present invention wherein the organic acid used for acidifying pseudoboehmite alumina is selected from the group consisting of acetic acid, formic acid, nitric acid and hydrochloric acid or a mixture thereof.

Still another embodiment of the present invention wherein said catalyst produces gasoline having Research Octane Number (RON) 92–93.

Yet another embodiment of the present invention wherein the particle size of the catalyst is the range of 20–150 microns.

Still another embodiment of the present invention wherein the particle size of the catalyst is in the range of 30–100 microns.

Yet another embodiment of the present invention wherein said catalyst having reduced coke formation property in the range of 12.99–12 wt %.

An embodiment also provides a process for preparing a hydrocarbon conversion, stabilized dual zeolite catalyst, said catalyst comprising a stabilized high silica zeolite and a low silica molecular sieve, said process comprising the steps of:

(a) loading high silica zeolite into a reactor and maintaining the zeolite at a temperature ranging between 100–125° C. for about 30 minutes;

(b) heating the high silica zeolite to a temperature in the range of 450–500° C. for about 90 minutes in nitrogen atmosphere;

(c) holding the zeolite at about 450–600° C. for about 90 minutes in an atmosphere of steam containing phosphate;

(d) cooling the zeolite to obtain the stabilized high silica zeolite;

(e) treating an alumina with a dilute acid and gelling it for about 10 minutes to obtain an alumina binder;

(f) adding demineralized water to the alumina binder to make the alumina binder free flowing;

(g) adding an acidified ammonium polysilicate to the alumina binder;

(h) adding a milled clay slurry to the product of step (g);

(i) adding a milled slurry of the low silica molecular sieve to the product of step (h);

(j) adding demineralized water to the product of step (i) to obtain a silica-alumina-clay-low silica molecular sieve slurry;

(k) adding the stabilized high silica zeolite as obtained in step (d) to the silica-alumina-clay-low silica molecular sieve slurry of step (j); and (l) spray-drying the product of step (k) and calcining the resulting product to obtain the stabilized dual zeolite catalyst.

Still another embodiment of the present invention wherein the stabilization of high silica zeolite can be optionally performed in the following steps:

(a) preparing phosphate-clay slurry using a phosphate source and a clay with demineralised water;

(b) adding high silica zeolite to the slurry;

(c) drying the product at a temperature in the range of 60–120° C. in an oven; and (d) pulverizing the product followed by calcination at about 400–600° C. to obtain stabilized high silica zeolite;

Yet another embodiment of the present invention wherein the stabilized high silica zeolite has silica to alumina ratio from 10 to 300.

Still another embodiment of the present invention wherein the high silica zeolite is selected from the group consisting of ZSM-5, ZSM-11, ZSM-12, ZSM-23, ZSM-35, ZSM-38, ZSM-48, ZSM-57, Zeolite beta, mordenite and preferably ZSM-5.

Yet another embodiment of the present invention wherein the stabilized high silica zeolite contains optionally clay selected from the group consisting of kaolin and halloysite.

Still another embodiment of the present invention wherein the phosphate source is selected from the group consisting of phosphoric acid, ammonium di hydrogen phosphate, ammonium mono hydrogen phosphate, tri-ammonium phosphate, ammonium hypophosphate, ammonium ortho phosphate, ammonium di hydrogen ortho-phosphate, ammonium mono hydrogen ortho-phosphate, ammonium hypo phosphite, ammonium di hydrogen ortho-phosphite or a mixture thereof.

Yet another embodiment of the present invention wherein the colloidal silica sol has a pH between 7.0 and 11.5.

Still another embodiment of the present invention wherein the colloidal silica consists of silica particles having a mean diameter ranging from about 4 nm to 30 nm.

Yet another embodiment of the present invention wherein the colloidal silica contains soda in the range of from 0.01 to 0.20 wt %.

Still another embodiment of the present invention wherein said silica sol is acidified to a pH between 0.5 and 3.5 before use.

Yet another embodiment of the present invention wherein said silica sol is acidified using a acid selected from group consisting of nitric acid, hydrochloric acid, formic acid and acetic acid.

Still another embodiment of the present invention wherein said alumina is a pseudoboehmite.

Yet another embodiment of the present invention wherein said alumina has crystallite size ranging from about 3 nm to about 30 nm.

Still another embodiment of the present invention wherein said alumina has soda content ranging between 0.001 and 0.1 wt %.

Yet another embodiment of the present invention wherein the alumina used is acidified using acids selected from the group consisting of acetic acid, formic acid, nitric acid and hydrochloric acid or a mixture thereof.

Still another embodiment of the present invention wherein ratio of high silica zeolite to low silica molecular sieve is in the range of 1–50:1–40. (1:40 to 50:1).

The present invention is further explained in the form of following preferred embodiments.

Clays

Clays are commonly used as major component of cracking catalysts. They are favored due to their low cost and used as diluent and density modifier. Clays are used in finely divided form with a size below 3 microns. The most common varieties of clays used in cracking catalyst formulations are kaolinite and halloysite. Clays have a two-layer structure, consisting of alternating sheets of silica in tetrahedral configuration and alumina in octahedral configuration. These sheets are separated with a gap of 7.13° A. Dry atmosphere equilibrated clay has moisture content of about 15 wt %. Clays are good sources for silica and alumina as they contain about 45 wt % of silica and 38 wt % of alumina.

Synthetic Faujasite

Synthetic faujasite also referred to, as Y zeolites are the most commonly used crystalline inorganic aluminosilicates, having pores in the range 6.5 to 13.5° A in its framework. These zeolites are synthesized with $SiO_2$ to $Al_2O_3$ ratio in the range 4.5 to 6 and 12–13-wt % $Na_2O$. To make them suitable for catalytic application, soda present inside for balancing electrovalence is required to be exchanged with a proton, via ammonium exchange followed by calcination. Higher silica to alumina ratio zeolite may be further prepared by modification of synthetic forms by steaming, chemical treatment or replacement of framework aluminum with silica. These modification steps for ultrstabilization of Y zeolite drastically reduce the catalytic activity of the zeolite. Rare earth loaded faujasite zeolite exhibit superior hydrothermal stability without requiring enhancing silica alumina ratio of framework. Rare earth may be one of or the mixture of rare earth oxides lanthanum, cerium, praseodymium, neodymium, samarium and gadolinium. Total rare earth oxide content in the zeolite may vary from 0.1 wt % to 10 wt %.

Stabilized ZSM-5 Zeolite

ZSM-5 zeolites are medium pore, high silica crystalline inorganic material having pores in the range 5.4 to 5.5° A. This zeolite is known for dewaxing and isomerization abilities of hydrocarbons. In cracking processes, these zeolites lead to production of higher LPG and high-octane gasoline. ZSM-5 zeolites with conventional silica alumina binders cannot sustain LPG selectivity due to the requirement of stabilization of acid sites and pores with phosphate radicals.

The present invention shows how to stabilize ZSM-5 zeolite using phosphate compounds, so that these can be incorporated into conventional silica-alumina based binders along with rare earth exchanged Y zeolite. Step of zeolite modification involves reacting the required amount of phosphates with clay and ZSM-5 zeolite, drying, pulverizing and calcination of the product. Zeolite stabilization may be carried out with a novel procedure of steaming in presence of phosphate source. The phosphate source could be phosphoric acid, ammonium di hydrogen phosphate, ammonium mono hydrogen phosphate, tri-ammonium phosphate, ammonium hypophosphate, ammonium ortho phosphate, ammonium di hydrogen ortho-phosphate, ammonium mono hydrogen ortho-phosphate, ammonium hypophosphite, ammonium di hydrogen ortho-phosphite, and mixture thereof. Stabilization of ZSM-5 zeolite with clay and phosphate results in a product with unchanged or partially increased surface area and crystallinity for ZSM-5 zeolite. Increase in surface area and crystallinity may be attributed to the extension of the zeolite to crystalline alumina phosphate having structure analogous to ZSM-5. ZSM-5 zeolites with silica alumina molar ratio varying from 10 to 300 may be considered for preparing stabilized zeolite.

Colloidal Silica

Colloidal silica is aqueous colloidal dispersions of silica particles, stabilized by the use of small quantities of soda or ammonium. These products having soda less than 0.2 wt % and can be readily used for matrix or catalyst binding purpose. These are stable between pH of 8.5 and 11. These products are commercially available in varying particle size ranging from 7 to 22 nm.

Alumina

Pseudoboehmite alumina with soda, less than 0.1 wt % are ideal binders for different zeolite based catalysts as they can be converted to a glue by reacting with acids like nitric acid, formic acid or acetic acid. Glue alumina can be mixed with molecular sieve, clay and colloidal silica and spray dried. Once spray dried product is calcined, alumina gets transformed into gamma phase, a hard material, which holds clay, zeolite and other catalyst ingredients together to form attrition resistant mass. Varieties of pseudoboehmite alumina are commercially available in different crystallite sizes and surface area.

Cracking Catalyst

In a preferred method for preparing cracking catalyst of present invention, (a) a stabilized high silica zeolite is prepared by reacting a phosphate compound with pure high silica zeolite or with a mixture of clay and high silica zeolite at higher temperature preferably under steaming conditions, (b) preparing silica alumina binder by reacting acidified colloidal silica using preferably an organic acid with a glue alumina prepared by geling pseudoboehmite alumina with an organic acid, (c) adding finely ground paste of kaolin clay to silica alumina binder under vigorous stirring, (d) followed by addition of a finely ground slurry of low silica zeolite under stirring, (e) further, followed by addition of finely ground slurry of stabilized high silica zeolite to obtain a slurry ready for spray drying having composition, 1 to 50 wt % stabilized high silica zeolite, 5 to 30 wt % alumina binder, 1 to 15 wt % silica, 10 to 50 wt % kaolin clay and 1 to 40 wt % low silica molecular sieve, (f) drying the slurry and (g) calcination.

The present invention is further explained in the form of following examples. However, these examples should not be construed as limiting the scope of the invention.

EXAMPLE 1

Preparation of Stabilized High Silica Zeolite 50 gm of diammonium hydrogen phosphate is dissolved in 250 gm demineralised water. To this phosphate solution, 205.3 gm of kaolin clay (having 15 wt % moisture content) is added under vigorous stirring. To the clay-phosphate slurry, a fine paste of zeolite prepared by grinding 64.52 gm of ZSM-5 zeolite (having $SiO_2/Al_2O_3$ ratio of 30 and moisture content 7 wt %) with 65 gm de-mineralized water, is added under vigorous stirring. Final slurry with solid content of 42 wt % and having pH of 7.5 is oven dried, pulverized and calcined to 500° C. The stabilized zeolite thus obtained having a surface area of 86 $m^2/gm$ and ZSM-5 content of 24% (as determined by X-ray diffraction) is considered for the preparation of stabilized dual zeolite catalyst.

EXAMPLE 2

Preparation of Stabilized Pure High Silica Zeolite 100 gm of hydrogen form of ZSM-5 zeolite, is loaded into a steam reactor and heated to 125° C. for about 30 minutes, while the zeolite is purged with nitrogen gas. After holding the zeolite for 30 minutes, it is further heated to 500° C. for another 90 minutes. When the temperature of the zeolite reaches 500° C., the zeolite is maintained at that temperature for 90 minutes, while a 50 gm solution having dissolved diammonium hydrogen phosphate (6 gm in 44 gm de-mineralized water), is injected into the hot zeolite. At the end zeolite is allowed to cool. This procedure gives stabilized ZSM-5 zeolite, which can be easily incorporated into FCC catalyst formulation along with low soda faujasit zeolite. The phosphate stabilized ZSM-5 having a surface area of 330 $m^2/gm$ and X-ray crystallinity of 92% is considered for the preparation of stabilized dual zeolite catalyst.

EXAMPLE 3

Preparation of Cracking Catalyst Using Stabilized High Silica Zeolite as Prepared Under Example 1

10.5 gm of formic acid is diluted in 196 gm de-mineralized water. To this acid 69.08 gm of Pural SB grade alumina (having moisture content 24.0 wt %) is added under stirring. This acidified alumina slurry is allowed to gel for 10 minutes and after words made free flowing by adding 100 gm of de-mineralized water. 18.75 gm of ammonium polysilicate (SiO2, 40 wt %) is acidified with 2 gm of formic acid (85 wt %) diluted in 10 gm de-mineralized water and added to the gel alumina under stirring. To the silica alumina slurry 270 gm of milled kaolin clay slurry (solid content 50 wt %) is added under stirring. For making the slurry free flowing 100 gm of additional de-mineralized water is used. 40.32 gm of REY zeolite (4 wt % $Re_2O_3$, 1 wt % $Na_2O$ and 7 wt % moisture) is ground in to a fine paste with equivalent weight of de-mineralized water and this is added to silica-alumina-clay slurry. Finally, 67.5 gm of stabilized high silica zeolite prepared as per example 1, is added to the silica-alumina-clay-REY zeolite slurry under stirring. At the end a slurry having pH 2.9 is spray dried. Dried micro spheres are calcined at 500° C. for one hour. Catalyst fraction between 20 micron and 120 micron is steamed at ° C. for 3 hours under 100 wt % steam for equilibrating the catalyst.

Thus steamed catalyst is evaluated using a mix feed consisting 80 wt % RCO and 20 wt % coker gasoline (feed properties are shown in Tables 1 and 2) with a catalyst to oil ratio of 3. Under this condition catalyst produced products as shown in Table 3.

TABLE 1

Physico-chemical properties of mix feed.

| PROPERTIES | VALUES |
|---|---|
| Density | 0.9088 |
| ° API | 24.21 |
| CCR, wt % | 4.46 |
| Sulfur, wt % | 0.28 |
| H content, wt % | 12.08 |
| V, wt % | <0.1 |
| Ni, wt % | <0.44 |
| Fe, wt % | 3.24 |
| Cu, wt % | <0.1 |
| Na, wt % | 3.84 |
| Basic nitrogen, pip | 443.60 |
| Viscosity, CST @ | |
| 50° C. | 37.00 |
| 100° C. | 5.9 |
| Paraffin wt % | 33.02 |
| Olefin, wt % | 9.4 |
| Naphthalene, wt % | 16.84 |
| Aromatics, wt % | 40.74 |

TABLE 2

ASTM Distillation, D1160 data of mix feed.

| Wt % | ° C. |
|---|---|
| Initial Boiling Point (IBP) | 39 |
| 5 | 40 |
| 10 | 43 |
| 20 | — |
| 30 | 402 |
| 40 | — |
| 50 | 444 |
| 60 | — |
| 70 | 509 |
| 80 | — |
| 90 | 570 |
| 95 | 648 |
| Final Boiling Point (FBP) | 720 |

EXAMPLE 4

This Example Describes a Procedure for the Preparation of Cracking Catalyst Employing Stabilized Pure Zeolite as Obtained in Example 2

10.5 gm of formic acid is diluted in 196 gm de-mineralized water. To this acid 69.08 gm of Pural SB grade alumina (moisture content 24.0 wt %) is added under stirring. This acidified alumina slurry is allowed to gel for 10 minutes. This gel is made free flowing by adding 100 gm of de-mineralized water. 18.75 gm of ammonium polysilicate ($SiO_2$, 40%) is acidified with 2 gm of formic acid (85 wt %) diluted in 10 gm de-mineralized water and added to the gel alumina under stirring.

To the silica alumina slurry, 375 gm of fine, milled clay slurry (50 wt % solid content) is added under stirring. For making the slurry free flowing 100 gm of additional de-mineralized water is added under stirring. 40.32 gm of REY zeolite (4 wt % $Re_2O_3$, 1 wt % $Na_2O$ and 7 wt % moisture) is ground in to a fine paste with equivalent weight of de-mineralized water and this is added to silica-alumina-clay slurry. Finally, a slurry of stabilized pure high silica zeolite (stabilized zeolite from Example 2), prepared by milling 15 gm of zeolite with 20 gm of de-mineralized water is added to the slurry of silica-alumina-clay-REY zeolite, under stirring. At the end slurry with pH 2.8 is spray dried.

Dried micro spheres are processed similar to that of Example 3. Results of characterization and performance are shown in Table-3.

TABLE 3

| Catalyst | Prepared as per Example 3 | Prepared as per Example 4 | Prepared as per Example 5 |
|---|---|---|---|
| Surface area M2/gm | 130 | 132 | 130 |
| Fresh, calcined | 110 | 111 | 107 |
| Steamed at, 750 C./ 3 hrs %, surface area retention | 84.6 | 84.1 | 82.3 |
| ZSM-5 content by XRD Fresh, catalyst | 5 | 5 | 4.8 |
| Steamed catalyst at, 750 ° C./3 hrs. | 5.6 | 5.7 | 5.0 |
| Y zeolite content by XRD Fresh, catalyst | 12 | 11.8 | 11.8 |
| Steamed catalyst | 8 | 7.9 | 8.0 |
| Catalyst to oil ratio, (w/f) | 3.0 | 3.0 | 3.0 |
| Conversion, wt % | 80.51 | 80.66 | 85.41 |
| LPG, wt % | 30.93 | 32.02 | 22.97 |
| Gasoline, wt % | 20.41 | 21.02 | 24.86 |
| Total cycle oil, wt % | 22.94 | 22.97 | 18.63 |
| Bottom, 370+, wt % | 3.86 | 3.52 | 3.22 |
| Coke, wt % | 12.99 | 12.00 | 20.26 |
| Gasoline RON | 93 | 92 | 89 |

EXAMPLE 5

This Example Shows Inadequate Stability of a Catalyst Prepared by Employing a Binder Disclosed Under Example 17 of U.S. Pat. No. 5,190,902.

A cracking catalyst is prepared having composition, clay 80.3 wt %, REY zeolite 12.08 wt % and $PO_4$ 7.6 wt %, taken from phosphoric acid 85 wt % as source. Spray dried micro spheres are calcined, steam deactivated and characterized for surface area and X-ray crystallinity, results of this study are shown in Table 4.

TABLE 4

Physico-chemical properties of catalyst prepared as per Example 5.

| Catalyst, example, 5 | Calcined catalyst | Steamed at 750° C. for 3 hours | Percent loss over calcined sample |
|---|---|---|---|
| Surface area, $M^2$/gm | 84 | 59 | 25 |
| Crystallinity, Y content % | 12 | 6 | 50 |

Advantages:

1. The dual zeolite catalyst of the present invention uses conventional silica alumina binder as a common binder for binding high silica zeolite and low silica molecular sieve.

2. The dual zeolite catalyst composition of the present invention, produce lower coke.

3. The dual zeolite catalyst of the present invention is effective towards conversion and increasing LPG yields.

All of the references cited hereinabove are incorporated by reference herein.

It is also to be appreciated that the foregoing description of the invention has been presented for purposes of illustration and explanation and is not intended to limit the invention to the precise manner of practice herein. It is to be appreciated therefore, that changes may be made by those skilled in the art without departing from the spirit of the invention and that the scope of the invention should be interpreted with respect to the following claims and equivalents thereof.

What is claimed is:

1. A process for preparing a hydrocarbon conversion, stabilized dual zeolite catalyst, said catalyst comprising a stabilized high silica zeolite and a low silica molecular sieve, said process comprising the steps of:
    (a) loading high silica zeolite into a reactor and maintaining the zeolite at a temperature ranging between 100–125° C. for about 30 minutes;
    (b) heating the high silica zeolite to a temperature in the range of 450–500° C. for about 90 minutes in nitrogen atmosphere;
    (c) holding the zeolite at about 450–600° C. for about 90 minutes in an atmosphere of steam containing phosphate;
    (d) cooling the zeolite to obtain the stabilized high silica zeolite;
    (e) treating an alumina with a dilute acid and gelling it for about 10 minutes to obtain an alumina binder;
    (f) adding demineralized water to the alumina binder to make the alumina binder free flowing;
    (g) adding an acidified ammonium polysilicate to the alumina binder;
    (h) adding a milled clay slurry to the product of step (g);
    (i) adding a milled slurry of the low silica molecular sieve to the product of step (h);
    (j) adding demineralized water to the product of step (i) to obtain a silica-alumina-clay-low silica molecular sieve slurry;
    (k) adding the stabilized high silica zeolite as obtained in step (d) to the silica-alumina-clay-low silica molecular sieve slurry of step (j); and
    (l) spray-drying the product of step (k) and calcining the resulting product to obtain the stabilized dual zeolite catalyst.

2. A process according to claim 1 wherein the stabilized high silica zeolite has silica to alumina ratio from 10 to 300.

3. A process according to claim 1 wherein the high silica zeolite is selected from the group consisting of ZSM-5, ZSM-11, ZSM-12, ZSM-23, ZSM-35, ZSM-38, ZSM-48, ZSM-57, Zeolite beta, and mordenite.

4. A process according to claim 1 wherein the stabilized high silica zeolite comprises clay selected from the group consisting of kaolin and halloysite.

5. A process according to claim 1 wherein the phosphate source is selected from the group consisting of phosphoric acid, ammonium di hydrogen phosphate, ammonium mono hydrogen phosphate, tri-ammonium phosphate, ammonium hypophosphate, ammonium ortho phosphate, ammonium di hydrogen ortho-phosphate, ammonium mono hydrogen ortho-phosphate, ammonium hypo phosphite, ammonium di hydrogen ortho-phosphite, and mixtures thereof.

6. A process according to claim 1 wherein the acidified ammonium polysilicate has a pH between 7.0 and 11.5 before acidification.

7. A process according to claim 1 wherein the acidified ammonium polysilicate consists of silica particles having a mean diameter ranging from about 4 nm to 30 nm.

8. A process according to claim 1 wherein the acidified ammonium polysilicate comprises soda in the range of from 0.01 to 0.20 wt %.

9. A process according to claim 1 wherein said acidified ammonium polysilicate is acidified to a pH between 0.5 and 3.5 before use.

10. A process according to claim 1 wherein said acidified ammonium polysilicate is acidified using an acid selected from group consisting of nitric acid, hydrochloric acid, formic acids and acetic acid.

11. A process according to claim 1 wherein said alumina is a pseudoboehmite.

12. A process according to claim 1 wherein said alumina has a crystallite size ranging from about 3 nm to about 30 nm.

13. A process according to claim 1 wherein said alumina has a soda content ranging between 0.001 and 0.1 wt %.

14. A process according to claim 1 wherein the dilute acid in step (e) is selected from the group consisting of acetic acid, formic acid, nitric acid, hydrochloric acid, and mixtures thereof.

15. A process according to claim 1 wherein the ratio of the high silica zeolite to the low silica molecular sieve is in the range of 1–50:1–40.

16. A process according to claim 1 wherein the high silica zeolite is ZSM-5.

17. A process according to claim 1 wherein:
the alumina is a pseudoboehmite;
the alumina has a crystallite size ranging from about 3 nm to about 30 nm; and
the alumina has a soda content ranging between 0.001 and 0.1 wt %.

18. A process according to claim 1 wherein:
the stabilized high silica zeolite has silica to alumina ratio from 10 to 300;
the high silica zeolite is ZSM-5;
the alumina is a pseudoboehmite;
the alumina has a crystallite size ranging from about 3 nm to about 30 nm;
the alumina has a soda content ranging between 0.001 and 0.1 wt %; and
the ratio of the high silica zeolite to the low silica molecular sieve is in the range of 1–50:1–40.

19. A process for preparing a hydrocarbon conversion, stabilized dual zeolite catalyst, said catalyst comprising a stabilized high silica zeolite and a low silica molecular sieve, said process comprising the steps of:
(a) preparing a phosphate-clay slurry using a phosphate sources, a clay, and demineralized water;
(b) adding a high silica zeolite to the slurry;
(c) drying the product of step (b) at a temperature in the range of 60–120° C. in an oven; and
(d) pulverizing the product of step (c) and calcining the resulting product at about 400–600° C. to obtain the stabilized high silica zeolite;
(e) treating an alumina with a dilute acid and gelling it for about 10 minutes to obtain an alumina binder;
(f) adding demineralized water to the alumina binder to make the alumina binder free flowing;
(g) adding an acidified ammonium polysilicate to the alumina binder;
(h) adding a milled clay slurry to the product of step (g);
(i) adding a milled slurry of the low silica molecular sieve to the product of step (h);
(j) adding demineralized water to the product of step (i) to obtain a silica-alumina-clay-low silica molecular sieve slurry;
(k) adding the stabilized high silica zeolite as obtained in step (d) to the silica-alumina-clay-low silica molecular sieve slurry of step (j); and (l) spray-drying the product of step (k) and calcining the resulting product to obtain the stabilized dual zeolite catalyst.

20. A process according to claim 19 wherein the stabilized high silica zeolite has silica to alumina ratio from 10 to 300.

21. A process according to claim 19 wherein the high silica zeolite is selected from the group consisting of ZSM-5, ZSM-11, ZSM-12, ZSM-23, ZSM-35, ZSM-38, ZSM-48, ZSM-57, Zeolite beta, and mordenite.

22. A process according to claim 19 wherein the stabilized high silica zeolite comprises clay selected from the group consisting of kaolin and halloysite.

23. A process according to claim wherein the phosphate source is selected from the group consisting of phosphoric acid, ammonium di hydrogen phosphate, ammonium mono hydrogen phosphate, tri-ammonium phosphate, ammonium hypophosphate, ammonium ortho phosphate, ammonium di hydrogen ortho-phosphate, ammonium mono hydrogen ortho-phosphate, ammonium hypo phosphite, ammonium di hydrogen ortho-phosphite, and mixtures thereof.

24. A process according to claim 19 wherein the acidified ammonium polysilicate has a pH between 7.0 and 11.5 before acidification.

25. A process according to claim 19 wherein the acidified ammonium polysilicate consists of silica particles having a mean diameter ranging from about 4 nm to 30 nm.

26. A process according to claim 19, wherein the acidified ammonium polysilicate comprises soda in the range of from 0.01 to 0.20 wt %.

27. A process according to claim 19 wherein said acidified ammonium polysilicate is acidified using an acid selected from group consisting of nitric acid, hydrochloric acid, formic acid, and acetic acid.

28. A process according to claim 19 wherein said alumina is a pseudoboehmite.

29. A process according to claim 19 wherein said alumina has a crystallite size ranging from about 3 nm to about 30 nm.

30. A process according to claim 19 wherein said alumina has a soda content ranging between 0.001 and 0.1 wt %.

31. A process according to claim 19 wherein the dilute acid in step (e) is selected from the group consisting of acetic acid, formic acid, nitric acid, hydrochloric acid, and mixtures thereof.

32. A process according to claim 19 wherein the ratio of the high silica zeolite to the low silica molecular sieve is in the range of 1–50:1–40 .

33. A process according to claim 19 wherein the high silica zeolite is ZSM-5.

34. A process according to claim 19 wherein:
the alumina is a pseudoboehmite;
the alumina has a crystallite size ranging from about 3 nm to about 30 nm; and
the alumina has a soda content ranging between 0.001 and 0.1 wt %.

35. A process according to claim 1 wherein:
the stabilized high silica zeolite has silica to alumina ratio from 10 to 300;
the high silica zeolite is ZSM-5;
the alumina is a pseudoboehmite;
the alumina has a crystallite size ranging from about 3 nm to about 30 nm;
the alumina has a soda content ranging between 0.001 and 0.1 wt %; and
the ratio of the high silica zeolite to the low silica molecular sieve is in the range of 1–50: 1–40.

* * * * *